April 2, 1935.  T. NAGEL  1,996,167

GAS PROCESS

Filed Nov. 10, 1934

INVENTOR
Theodore Nagel.
BY
Liddle, Bethell and Montgomery,
ATTORNEYS

Patented Apr. 2, 1935

1,996,167

UNITED STATES PATENT OFFICE 1,996,167

GAS PROCESS

Theodore Nagel, Brooklyn, N. Y., assignor to Carburetted Gas, Inc., a corporation of Delaware Application November 10, 1934, Serial No. 752,502

6 Claims. (Cl. 48—213)

This invention is directed to an improved process for use in connection with the manufactured gas industry, and has for one of its objects the provision of a process for the carburetting or enriching of a carbon monoxide hydrogen gas mixture such, for example, as constituting the subject matter of my prior application Serial No. 576,613, filed November 21, 1931.

My improved process may also be employed in conjunction with the production of water gas. Prior to my invention water gas made from solid fuel such as lump coke, anthracite or bituminous coal and steam in cyclic operation "blow" and "run" has been carburetted or enriched during the gas making "run" by atomizing the oil into the water gas and then heat treating in a carburetter and superheater (preheated during the "blow" operation) to gasify and crack the oil into hydrocarbon fixed gas. By the present invention, however, the hydrocarbon fixed gas enrichment is produced after introducing the hydrocarbons into the water gas but without subsequent heating.

In the practice of my method practically all oils may be used although I prefer to use the lower cost fuel oils thereby lowering the production cost of the gas enrichment.

To crack oil to hydrocarbon fixed gas, i. e. the simpler lighter weight paraffins and olefins of not more than three carbon atoms, requires energy in the form of heat at high heat intensity which provides the sensible heat attained by the fixed gas on completion of the cracking operations and also provides the latent heats for vaporizing the liquid oil and for cracking the hydrocarbon vapors to non-condensible hydrocarbon gas.

Accordingly I provide for supplying a portion of the total energy required as heat at lower heat intensity by preheating the oil while subjected to superatmospheric pressure to maintain the oil as a liquid during this preheating operation, thereby storing within the liquid oil sufficient heat to convert the liquid instantly to vapor on release of the pressure by injecting the preheated oil into a heat insulated zone.

Hydrocarbon technology developed by research investigations indicate hydrocarbon fixed gas are products of cracking the more complex hydrocarbons by heat treatment. Higher temperatures are required for cracking these fixed gases. Without the use of catalysts hydrocarbon fixed gases and the lighter weight vapors start cracking in the relative order as shown by the following temperature scale:

$CH_4$ 1650° F.

1550° F. $C_2H_4$ $C_2H_6$ 1475° F.

1375° F. $C_3H_6$ $C_3H_8$ 1300° F.

1200° F. $C_4H_8$ $C_4H_{10}$ 1100° F.

To crack the more complex hydrocarbon vapors to the simpler hydrocarbon fixed gases requires higher heat intensity than that used for vaporizing the oil and this additional energy as heat at higher intensity may be supplied by injecting the preheated oil into a heat insulated zone through which is flowing a fairly uniform temperature hot lean gas which is to be enriched and which contains in excess of the sensible heat required by this lean gas for its carburetting temperature the heat energy deficiency required for converting the hydrocarbon vapors to fixed gas.

Briefly, therefore, the present invention provides a process wherein oil is preheated while subjected to superatmospheric pressure, temperature and pressure conditions being so controlled that the oil will remain a liquid, this hot oil being introduced into a hotter lean gas which is to be enriched and which contains, in excess of the sensible heat required for its carburetting temperature, the heat energy deficiency required for converting substantially all of the preheated oil to fixed gas, thereby to effect through convection by gas diffusion conversion of the preheated oil to fixed gas and carburetion of the lean gas.

Throughout this description and in the appended claims the expression "substantially all" is to be interpreted to mean not substantially less than 85% of the oil charged or not substantially less than 90% of its hydrocarbon content.

Figure 1:
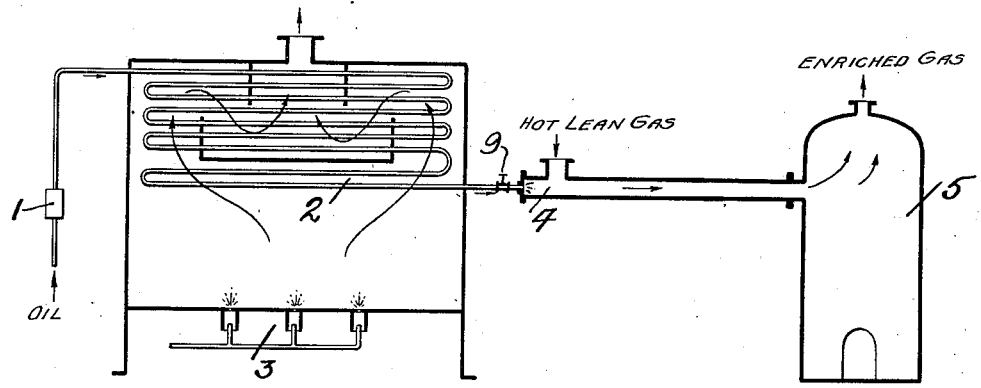
Fig. 1 illustrates diagrammatically one embodiment of my invention.

Referring more specifically to my invention and first of all with reference to the showing in Fig. 1 of the attached drawing, a 320 B. t. u. per cubic foot carbon monoxide hydrogen gas having a fairly constant temperature around 2750° F. may be enriched to 540 B. t. u. per cubic foot at a carburetting temperature around 1500° F. The hydrocarbon enrichment material in the form of liquid oil is supplied by oil pump 1 to an oil heater 2 at a pressure around 250 pounds per square inch. The heater may be externally heated by burners 3. The oil leaving the heater 2 is at a temperature around 875° F. At the pressure and temperature mentioned the oil remains liquid for the short time required to preheat the oil.

This preheated oil is introduced at the zone 4 into a substantially hotter lean gas which is to be carburetted or enriched and under the conditions above prescribed conversion of the preheated oil to fixed gas and carburetion of the lean gas is effected through convection by gas diffusion, the leaner gas introduced into the equipment at the point 4 containing in excess of the sensible heat required for its carburetting temperature the heat energy deficiency required for converting substantially all of the preheated oil to fixed gas. This enriched gas may then pass through a coke settling or dust collecting chamber 5.

As above pointed out the above example relates to a 320 B. t. u. gas which has a fairly constant temperature of 2750° F. and which is to be enriched to 540 B. t. u. per cubic foot at a carburetting temperature around 1500° F.

However, when it is desired to enrich the lean gas to a thermal value, for example, around 800 B. t. u. per cubic foot, the excess energy in the lean gas at around 2750° F. above its carburetting temperature around 1500° F. is not sufficient to crack the requisite amount of oil preheated to around 875° F. when the oil is injected into the hotter lean gas.

Figure 2:
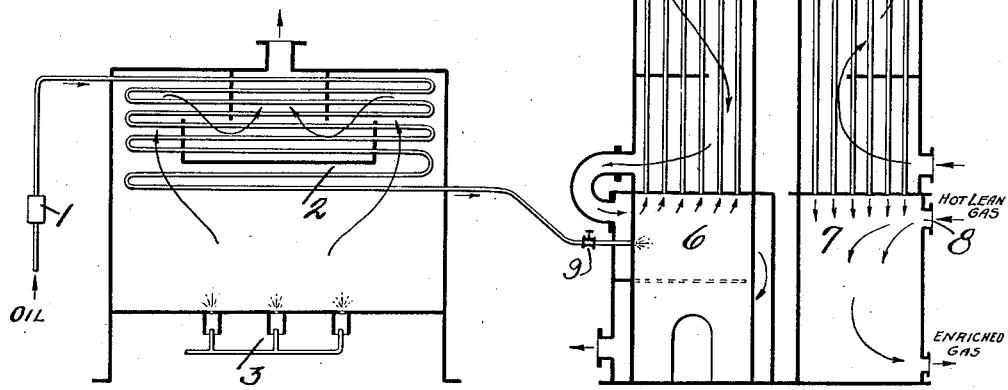
Fig. 2 is a diagrammatic showing of another embodiment of the invention.

In this case, therefore, the enrichment material is supplied to oil heater 2 by pump 1, Fig. 2, as in the case of Fig. 1, at a pressure of around 250 pounds per square inch and in the heater the oil is heated to around 875° F by the burners 3, the same as before. Instead of introducing this preheated oil directly into the hotter lean gas to be enriched, the preheated oil is released or injected into a vapor gas heater 6, Fig. 2, a well known type of apparatus. Flowing through this heater the hydrocarbon vapors may be heated to approximately 1200° F. thereby supplying the necessary heat deficiency over and above the excess heat contained in the lean gas to be enriched and these hydrocarbon vapors at this temperature of approximately 1200° F. flow into a heat insulated zone 7 into which the lean gas to be enriched is being introduced, through inlet 8, at a fairly constant temperature around 2750° F., to effect through convection by gas diffusion conversion of the preheated oil to fixed gas and carburetion of the lean gas to produce a carburetted gas having a thermal value of, for example, around 800 B. t. u. per cubic foot. In this example, therefore, the enrichment material as a liquid is preheated under pressure, then released or introduced through valve 9 into the hotter zone 6, which it will be appreciated is externally heated, for supplying the necessary heat deficiency over and above the excess heat contained in the lean gas above its carburetting temperature so that when the hot hydrocarbon vapors are mixed with the lean gas introduced at 8 substantially all of the enrichment material will be converted through convection by gas diffusion to fixed gas and the desired carburetion or enrichment of the lean gas effected.

As above pointed out the present invention is also adapted for use in connection with the enrichment of water gas to public utility standard, around 550 B. t. u. per cubic foot thermal value. For this purpose the water gas should have a fairly constant temperature. In standard methods of manufacture the temperature of the water gas at the beginning of the "run" is sufficiently high but this temperature steadily drops to the end of the "run". Accordingly when enriching water gas I preheat the water gas flowing from the gas generator so as to deliver the same to the equipment of Fig. 1 at a desired fairly constant temperature. This can be easily accomplished by flowing the water gas through the preheated checker brick packed carburetter and superheater of the usual water gas equipment, the gas outlet of the superheater being connected to the equipment of Fig. 1 so that the water gas at a fairly constant temperature is introduced into the equipment at the point 4 to be mixed with the preheated oil, released through valve 9 into the equipment at this point, the water gas, as will be appreciated, containing, in excess of the sensible heat required by it for its carburetting temperature, the heat energy deficiency required for converting substantially all of the enrichment material to fixed gas and effect the desired carburetion of the water gas.

It will be appreciated from the foregoing that my invention is adapted for the enriching of carbon monoxide hydrogen gas, which may be manufactured by any suitable method, not necessarily by the methods I have referred to herein; the gas to be enriched, however, containing, in excess of the sensible heat required for its carburetting temperature, the heat energy deficiency required for converting substantially all of the enrichment material to fixed gas so as to effect through convection by gas diffusion conversion of the preheated enrichment material to fixed gas and enrichment of the lean gas to the desired thermal value.

Inasmuch as the preheated checker brick packed carburetter and superheater above mentioned in connection with the enrichment of water gas is standard equipment I have deemed it unnecessary to illustrate the same in the accompanying drawing, the essential being that the water gas shall be at a fairly constant temperature, it being appreciated as repeatedly pointed out above that the lean gas to be enriched shall contain, in excess of the sensible heat required for its carburetting temperature, the heat energy deficiency required for converting substantially all of the preheated oil, i. e. the enrichment material, to fixed gas, to effect through convection by gas diffusion conversion of the preheated oil to fixed gas and the desired carburetion of the lean gas.

This application is a continuation in part of my copending application Serial No. 639,025, filed October 22, 1932.

What I claim is:—

1. The process which comprises preheating oil while subjected to superatmospheric pressure and while so controlling temperature and pressure conditions that the oil will remain a liquid, and introducing this hot oil into a hotter lean gas to be enriched and which contains, in excess of the sensible heat required by the lean gas for its carburetting temperature, the heat energy deficiency required for converting substantially all of the preheated oil to fixed gas, to effect through convection by gas diffusion conversion of the preheated oil to fixed gas and carburetion of the lean gas.

2. The process which comprises preheating oil while subjected to superatmospheric pressure and while so controlling temperature and pressure conditions that the oil will remain a liquid and continuously introducing this hot oil into a continuous stream of hotter lean gas to be enriched and which contains, in excess of the sensible heat required by the lean gas for its carburetting temperature, the heat energy deficiency required for converting substantially all of the preheated oil to fixed gas, to effect through convection by gas diffusion conversion of the preheated oil to fixed gas and carburetion of the lean gas.

3. The process which comprises preheating oil while subjected to superatmospheric pressure and while so controlling temperature and pressure conditions that the oil will remain a liquid, introducing the heated oil by release of the pressure into a heat insulated zone containing a hotter lean gas to be enriched and which contains, in excess of the sensible heat required by the lean gas for its carburetting temperature, the heat energy deficiency required for converting substantially all of the preheated oil to fixed gas, to effect through convection by gas diffusion conversion of the preheated oil to fixed gas and carburetion of the lean gas.

4. The process which comprises preheating oil while subjected to superatmospheric pressure and while so controlling temperature and pressure conditions that the oil will remain a liquid, continuously introducing the heated oil by release of pressure into a heat insulated zone through which is continuously flowing a hotter lean gas to be enriched and which contains, in excess of the sensible heat required by the lean gas for its carburetting temperature, the heat energy deficiency required for converting substantially all of the preheated oil to fixed gas, to effect through convection by gas diffusion conversion of the preheated oil to fixed gas and carburetion of the lean gas.

5. The process which comprises preheating oil while subjected to superatmospheric pressure and while so controlling temperature and pressure conditions that the oil will remain a liquid, introducing the heated oil by release of pressure into an externally heated zone which is at a higher temperature, and introducing the hot oil vapor therefrom into a hotter lean gas to be enriched and which contains, in excess of the sensible heat required by the lean gas for its carburetting temperature, the heat energy deficiency required for converting substantially all of the preheated oil to fixed gas, to effect through convection by gas diffusion conversion of the preheated oil to fixed gas and carburetion of the lean gas.

6. The process which comprises preheating oil while subjected to superatmospheric pressure and while so controlling temperature and pressure conditions that the oil will remain a liquid, continuously introducing the heated oil by release of pressure into an externally heated zone which is at a higher temperature, and continuously introducing the hot oil vapor therefrom into a heat insulated zone through which is continuously flowing a hotter lean gas to be enriched and which contains, in excess of the sensible heat required by the lean gas for its carburetting temperature, the heat energy deficiency required for converting substantially all of the preheated oil to fixed gas, to effect through convection by gas diffusion conversion of the preheated oil to fixed gas and carburetion of the lean gas.

THEODORE NAGEL.